United States Patent
Mueller et al.

(10) Patent No.: US 9,614,342 B2
(45) Date of Patent: Apr. 4, 2017

(54) AIR-COOLED CARBON-DIOXIDE LASER

(71) Applicant: Coherent, Inc., Santa Clara, CA (US)

(72) Inventors: Eric R. Mueller, West Suffield, CT (US); Adrian Papanide, Shelton, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/688,369

(22) Filed: Apr. 16, 2015

(65) Prior Publication Data

US 2016/0308325 A1 Oct. 20, 2016

(51) Int. Cl.
*H01S 3/04* (2006.01)
*H01S 3/223* (2006.01)
*H01S 3/041* (2006.01)
*H01S 3/09* (2006.01)

(52) U.S. Cl.
CPC ............ *H01S 3/0404* (2013.01); *H01S 3/041* (2013.01); *H01S 3/0906* (2013.01); *H01S 3/2232* (2013.01)

(58) Field of Classification Search
CPC ................................ H01S 3/0404; H01S 3/041
See application file for complete search history.

(56) References Cited

U.S. PATENT DOCUMENTS

| | | | |
|---|---|---|---|
| 5,894,493 A * | 4/1999 | Sukhman | H01S 3/0315 372/34 |
| 5,901,167 A | 5/1999 | Sukhman et al. | |
| 6,788,722 B1 | 9/2004 | Kennedy et al. | |
| 8,422,528 B2 * | 4/2013 | Morrow | H01S 3/0315 372/36 |
| 8,731,015 B2 | 5/2014 | Newman et al. | |
| 2004/0179570 A1 * | 9/2004 | Vitruk | H01S 3/0315 372/55 |
| 2005/0123011 A1 | 6/2005 | Sukhman et al. | |
| 2009/0213885 A1 * | 8/2009 | DeMaria | H01S 3/2232 372/34 |
| 2012/0219028 A1 | 8/2012 | Morrow et al. | |
| 2012/0281728 A1 | 11/2012 | Demaria et al. | |

OTHER PUBLICATIONS

International Search Report and Written Opinion received for PCT Patent Application No. PCT/US2016/024948, mailed on Jun. 20, 2016, 13 pages.

\* cited by examiner

*Primary Examiner* — Tod T Van Roy
(74) *Attorney, Agent, or Firm* — Morrison & Foerster LLP

(57) ABSTRACT

A carbon dioxide waveguide-laser includes an elongated resonator unit and an elongated power-supply unit. The resonator and power-supply units are spaced by a cooling unit including a plurality of longitudinally extending, spaced-apart fins, with fans arranged to drive air through the spaces between the fins.

17 Claims, 6 Drawing Sheets the present invention relates in general to carbon-dioxide ($CO_2$) lasers energized by a radio-frequency (RF) discharge. The invention relates in particular to cooling arrangements for such lasers.

DISCUSSION OF BACKGROUND ART $CO_2$ lasers are used in several precision laser machining operations, in particular, hole-drilling in various substrate materials. In such an operation, the laser is operated in a pulsed manner, with an output beam of the laser steered by galvanometer mirrors to locations on a substrate where holes are to be drilled.

A problem with all such lasers is that during a warm-up period after the laser is turned on following a quiescent period, the output-beam direction, referred to as "pointing" by practitioners of the art changes progressively. This is due to rising of the temperature of the laser, and the complex mechanical and electrical design and construction of the laser. This pointing-change adversely affects steering of the beam by the galvanometers mirrors, sometimes to a point where hole-drilling cannot be carried out with a required precision.

The laser temperature, and accordingly the beam pointing, stabilizes after a certain time period, for example 5 minutes, making the galvanometer steering reproducible, as long as the laser remains turned on. This stabilization period, however, represents a period of lost production in the hole-drilling operation. There is a need for a design and construction of a $CO_2$ laser which can reduce if not altogether eliminate the pointing-stabilization period.

SUMMARY OF THE INVENTION

In one aspect, laser apparatus in accordance with the present invention comprises an elongated, gas filled resonator unit, and an elongated radio-frequency (RF) power-supply unit for energizing gas in the resonator unit. The resonator and power-supply units are aligned spaced apart and parallel to each other. A cooling unit includes a plurality of elongated fins separating the resonator and power-supply units. The fins are spaced-apart and parallel to each other, and extend in a length direction of the power supply and resonator units. A plurality of fans is arranged to drive air between the spaced-apart fins for cooling the power supply and resonator units.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
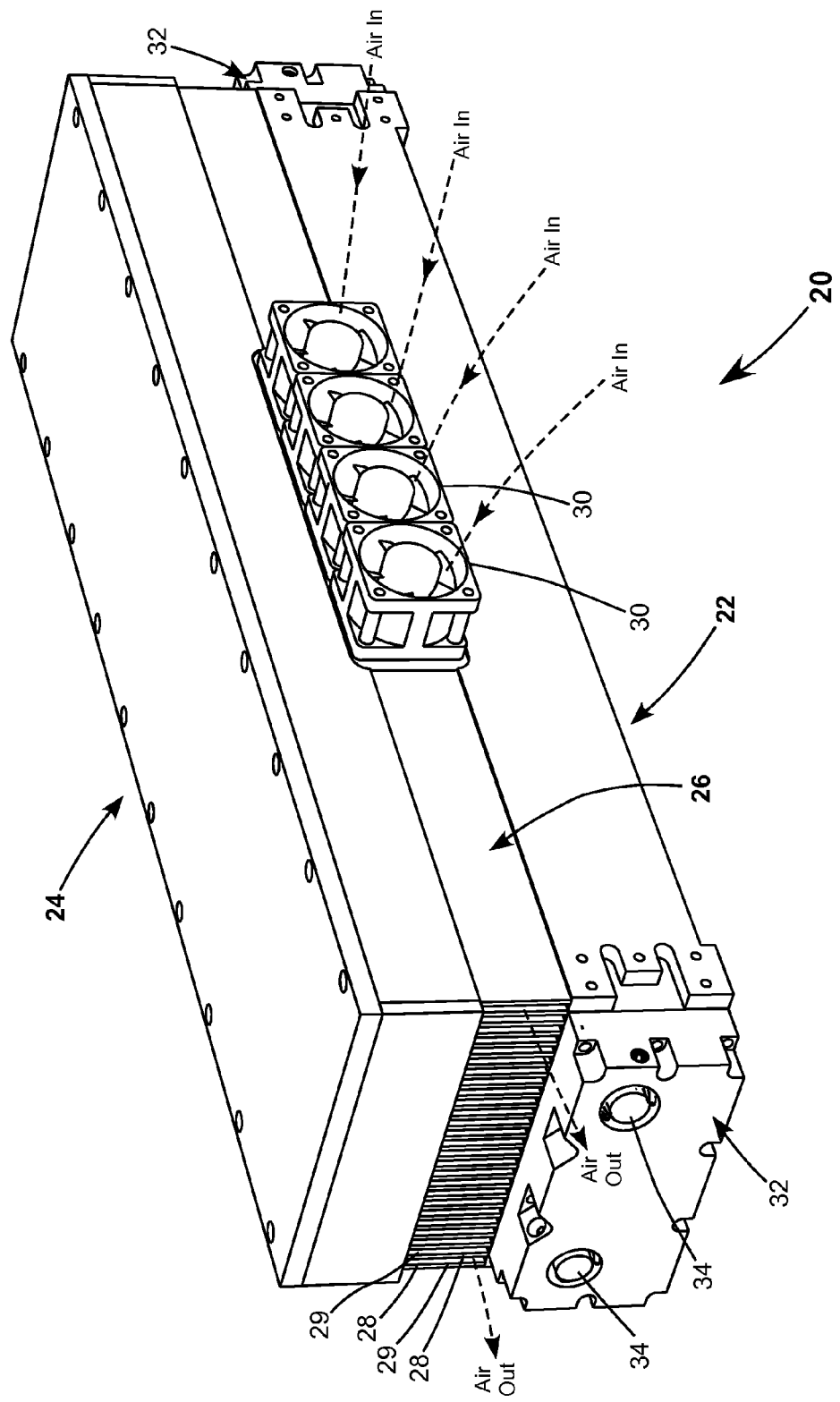
FIG. 1 is a perspective view schematically illustrating one preferred embodiment of $CO_2$ waveguide-laser apparatus in accordance with the present invention including an elongated resonator unit and an elongated power-supply unit spaced apart by an elongated cooling unit including a plurality of spaced-apart fins extending longitudinally between the resonator and power-supply units, and a plurality of fans arranged to drive air through the fins from the center of the cooling unit to the ends.
Figure 1A:
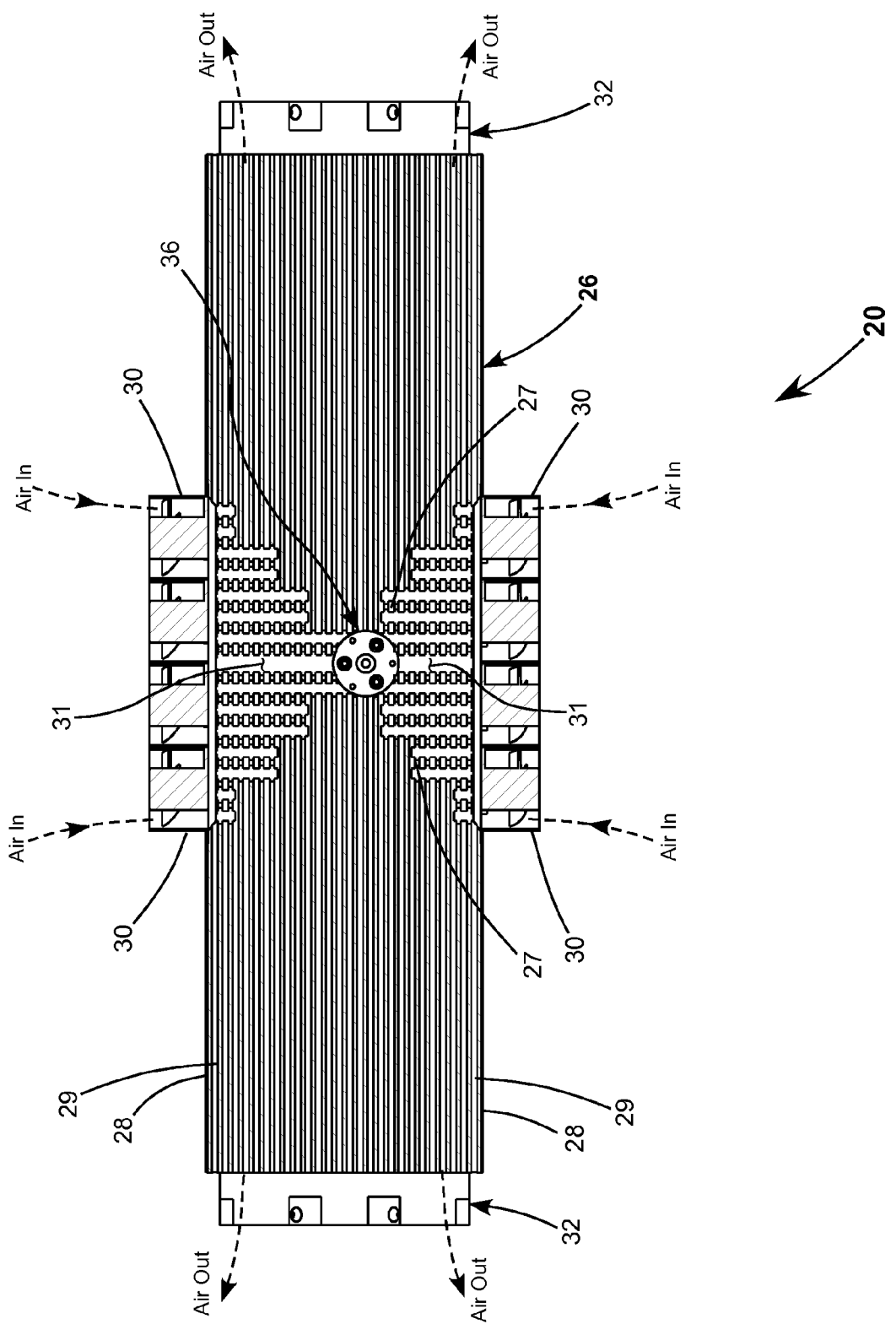
FIG. 1A is a longitudinal cross-section plan-view schematically illustrating details of the cooling unit of FIG. 1.
Figure 1B:
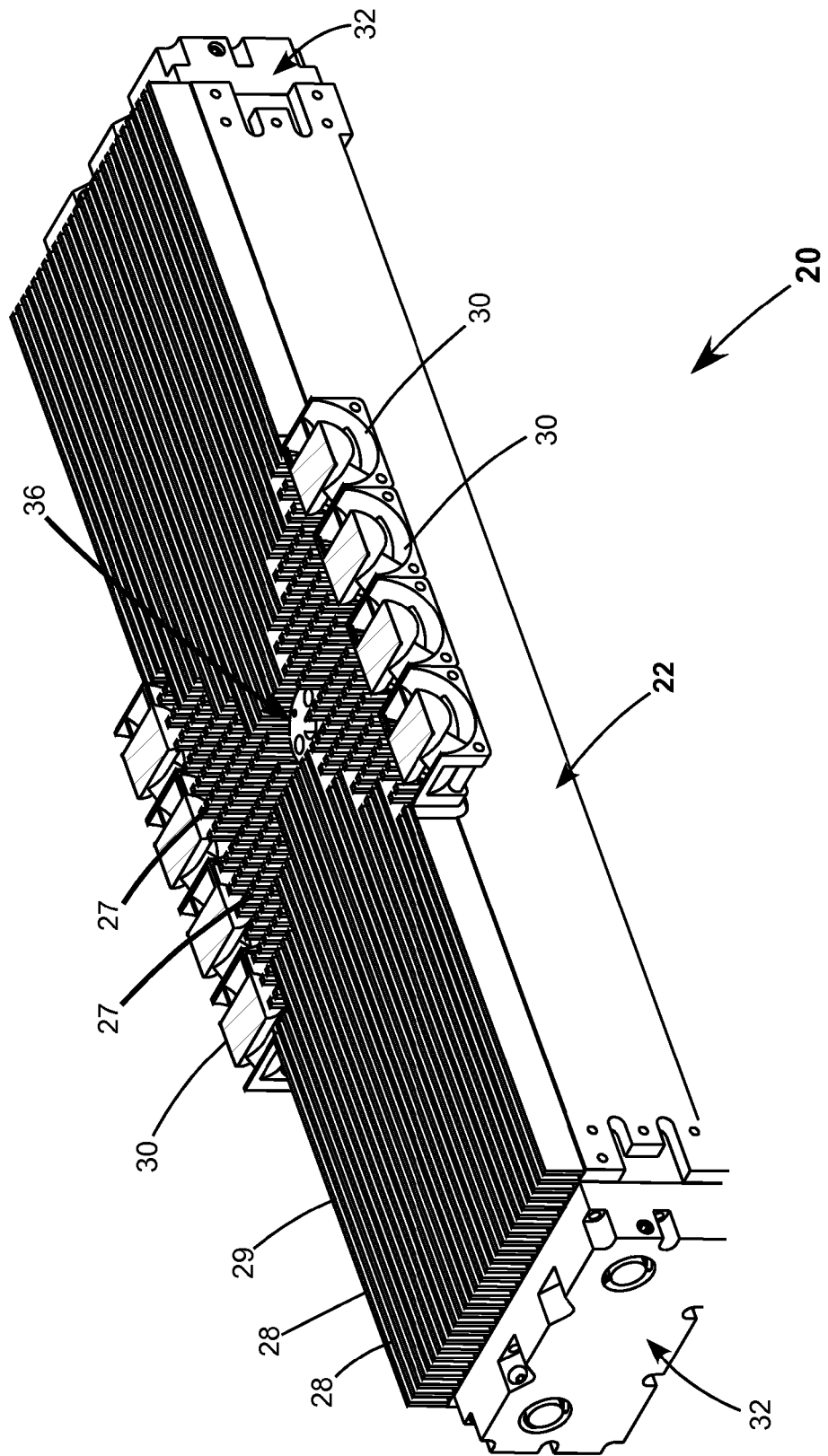
FIG. 1B is a longitudinal cross-section isometric view schematically illustrating further details of the cooling unit of FIG. 1.
Figure 1C:
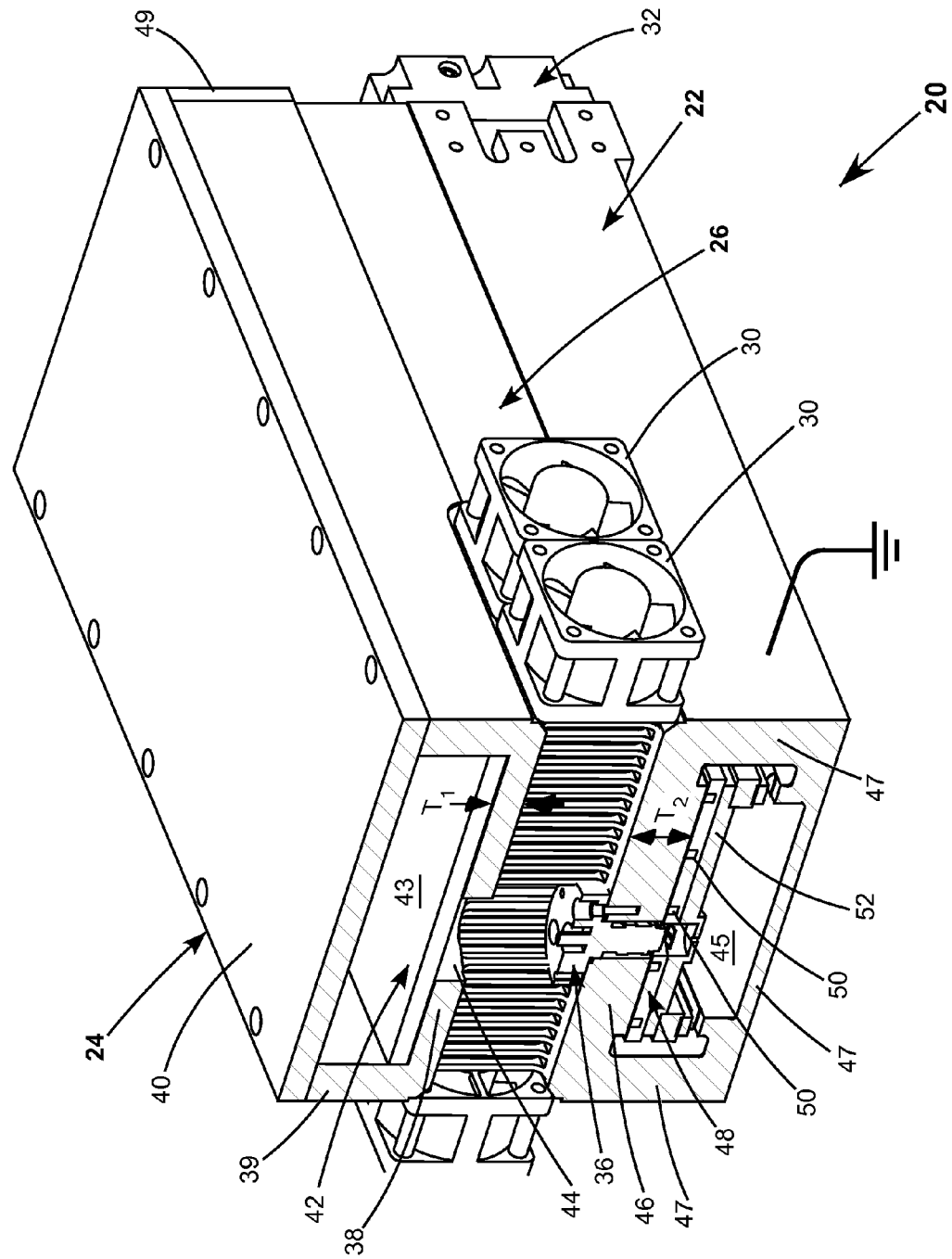
FIG. 1C is a lateral cross-section isometric view schematically illustrating details of the resonator and power-supply units and yet more details of the cooling unit of FIG. 1.

Turning now to the drawings, wherein like features are designated by like reference numerals, FIG. 1, FIG. 1A, FIG. 1B, and FIG. 1C schematically illustrate a preferred embodiment 20 of $CO_2$ waveguide-laser apparatus in accordance with the present invention. FIG. 1 depicts a complete laser. FIGS. 1A, 1B, and 1C depict details of the laser not visible in FIG. 1.

Laser 10 includes an elongated resonator unit 22, and an elongated RF power-supply unit 24 for energizing the resonator unit. The resonator and power-supply units have about the same length and width and are aligned parallel to each other spaced apart by a cooling unit 26 including a plurality of fins 28 spaced apart and parallel to each other in the width-direction of the laser and extending longitudinally between the resonator and power-supply units. A plurality of fans 30 on opposite sides of the cooling unit (see FIGS. 1A and 1B) is arranged to draw air into the cooling unit and drive the air through spaces 29 between fins 28 to exit the cooling at each end of thereof.

Resonator unit 22 is a sealed off enclosure having end plates 32 which accommodate resonator mirrors 34, only two of which are visible in the drawings. The resonator of unit 22 is preferably a folded resonator, with two mirrors terminating the resonator and others (not shown) for folding the resonator axis. It is pointed out here that only sufficient details of resonator unit of resonator unit 22 are described and depicted for understanding principles of the present invention. Details of $CO_2$ waveguide-lasers are well known in the art. A detailed description of folded-resonator $CO_2$ waveguide-lasers in several folding configurations is provided in U.S. Pat. No. 6,788,722, assigned to the assignee of the present invention, and the complete disclosure of which is hereby incorporated herein by reference.

Referring in particular to FIGS. 1A and 1B, in the arrangement of laser 20, fins 28 have different lengths, being longest in the center and progressively shorter towards the edges. The fins are arranges to leave plenum spaces 31 (see FIG. 1A) between fans 30 to receive the air-input from the fans. Within plenum spaces 31 is a plurality of baffles or "mini fins" 27 spaced apart in the length and width directions of the cooling unit.

In the absence of baffles 27, the plenum spaces would not be cooled by the flowing air as efficiently as the spaces occupied by fins 28. The collective length of baffles is selected to provide a reasonable compromise between increasing efficiency of cooling in the plenum spaces and obstructing air flow into the plenum spaces. Space is left between all fins and baffles to accommodate a sealed electrical feed through 36 for making electrical (RF) connection between power-supply unit 24 and resonator unit 22.

FIG. 1C schematically illustrates a preferred construction arrangement of inventive laser 20. Here, fins and baffles of cooling unit 26; an enclosure 45, base 46 and walls 47 resonator unit 22; and a base 38 and walls 39 of power-supply unit 24 are formed from a single aluminum extrusion. A cover plate 40 and end plates 49 (only one visible in FIG. 1C) complete an enclosure 43 for the power supply unit. End plates 32 complete sealed enclosure 45 for the resonator unit. Plenum spaces and baffles in cooling unit 26, depicted in FIGS. 1A and 1B are formed by machining into the sides of the extrusion. The term "base" applied to the resonator and power supply units indicates a component-mounting surface of the unit, and is independent of the physical orientation of the units Within enclosure 45 of the resonator unit is a ceramic plate 48, in a surface of which waveguide channels 50 are machined. Plate 48 is sandwiched between base 46 of the resonator unit and an electrode plate 52 which is electrically connected to feedthrough 36. The channeled side of ceramic plate 48 is in contact with base 46. With RF power applied to electrode plate 52, a gas discharge is created in channels 50 for energizing the laser-resonator.

Although the entire enclosure 46 is filled with the lasing gas, the discharge is generated only in channels 50, as the arrangement provides that only in the channels is the electric field sufficient to strike and maintain a discharge. Elsewhere the enclosure merely provides a gas-reservoir. Heat is generated as a result of the discharge in channels 50. Placing the channeled side of ceramic plate in 52 in contact with base 46 optimizes transmission of heat from the discharge to base 46 on a side thereof in contact with cooling unit 30.

Continuing with reference to FIG. 1C, in power supply unit 24 the actual power-supply is assembled on a printed circuit board 42 supported on base 38 of the power supply unit. An aperture 44 in base 38 provides for an electrical conductor (not shown) between the power-supply and electrical feed through 36 of resonator unit 22. Heat is generated in the RF power supply from the electrical impedance of electrical components (not shown). The power-supply is placed on base 38 of the power-supply unit to optimize heat conduction between the power-supply and cooling unit 26.

A particular advantage of the about central placement of common cooling unit 26 between resonator unit 22 and power-supply 24 minimizes any tendency for longitudinal bowing of the laser 20 (with corresponding change of beam pointing) minimizing if not altogether eliminating differential expansion between the power-supply unit and the resonator unit. Any such tendency is further minimized by constructing all components with the same material, such as aluminum as discussed above. Further, the elongated fin construction of cooling unit 26 provides for a high degree of longitudinal stiffness, which, in itself, resists what minimal bowing tendency might exist due to residual differential expansion.

The laser depicted in FIG. 1 and FIG. 1A is representative of a $CO_2$ waveguide laser having an output of 35 Watts (W) driven by an RF power-supply having an output power of 350 W. The laser has a length of about 30 centimeters (cm) and a width of about 9 cm. There are twenty-seven fins 28 across the width of the cooling unit. The fins have a height of about 25 millimeters (mm), a width of about 1.7 mm and are laterally spaced apart by 1.7 mm.

Referring in particular to FIG. 1C, thickness $T_1$ of base 38 of power supply unit 24 and thickness $T_2$ of resonator unit 22 are selected such that the inventive laser is thermo-mechanically neutral. The term "thermo-mechanically neutral" means that any tendency for longitudinal bowing of the inventive laser is minimized if not altogether eliminated. In the above example this condition is achieved when thickness $T_1$ is about 6 mm and thickness $T_2$ is about 12 mm. In general thickness $T_1$ will usually be less than thickness $T_2$, reflecting a fact that more heat is generated by the power supply than is generated by the gas-discharge of the laser resonator.

It is emphasized here that these above-specified dimensions are merely exemplary. Those skilled in the art, from the description presented herein, may select other dimensions for the same or different laser power and resonator configuration without departing from the spirit and scope of the present invention. Thermal and mechanical properties of such structures can be investigated using mechanical design software, such as SOLIDWORKS available from Dassault Systemes Inc. of Waltham, Mass.

It should be noted here that while the present invention is described above as incorporating a folded-resonator waveguide $CO_2$ laser with an operating mode guided in two mutually perpendicular transverse directions by a plurality of waveguide channels, principles of the invention are equally applicable to a resonator including a single, wide waveguide channel guiding a mode in only one transverse direction. In such a laser, an unstable resonator would be selected to guide the mode in a zig-zag path in a plane perpendicular to the waveguide direction. Such a laser is typically referred to by practitioners of the art as a slab $CO_2$ laser. One such laser is described in detail in U.S. Pat. No. 8,731,015, assigned to the assignee of the present invention, and the complete disclosure of which is hereby incorporated herein by reference.

Figure 2:
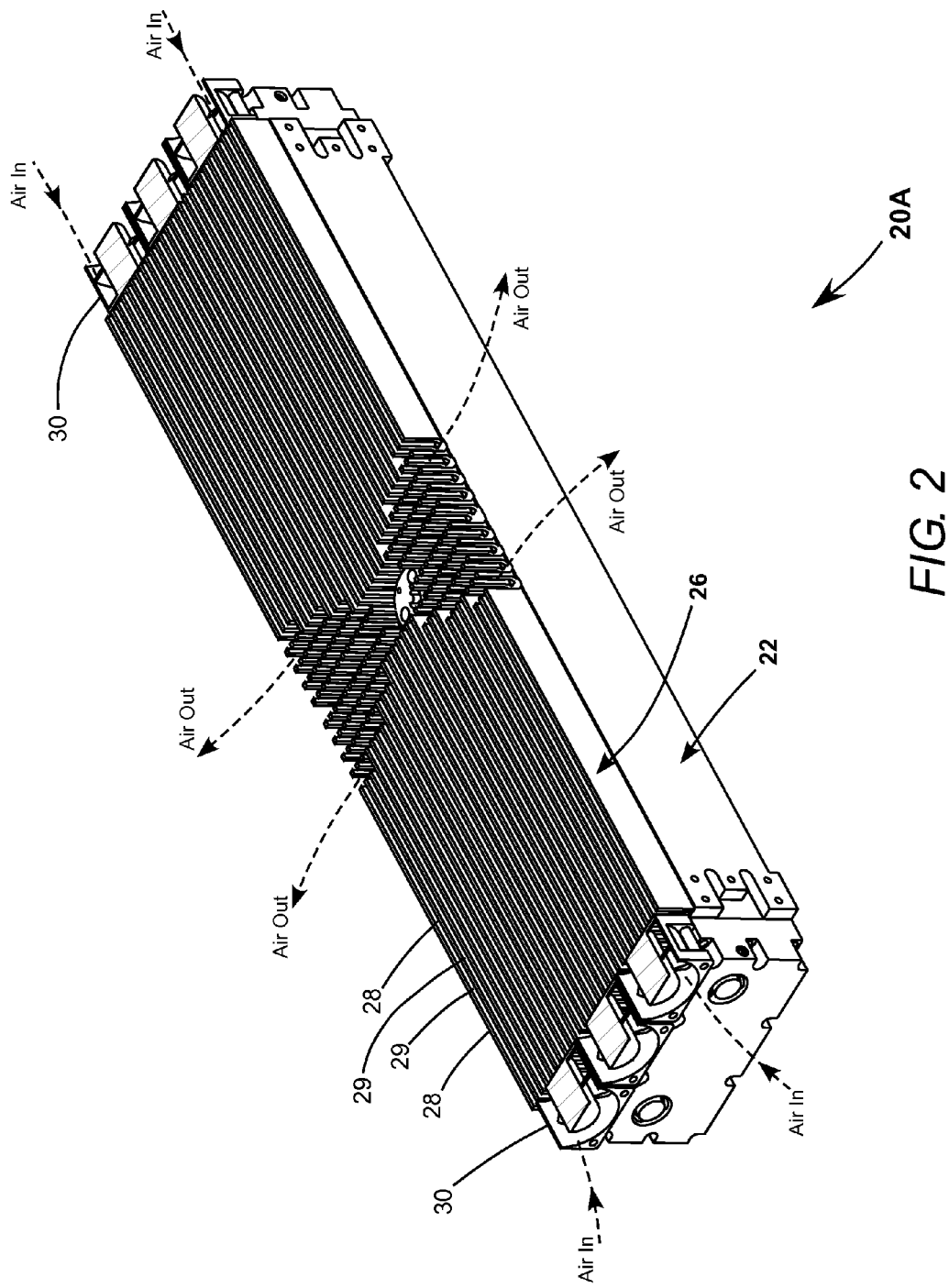
FIG. 2 is a longitudinal cross-section isometric view schematically illustrating another preferred embodiment of $CO_2$ waveguide-laser apparatus in accordance with the present invention, similar to the embodiment of FIG. 1, but wherein the fans are arranged to drive air through the cooling-unit fins from the ends of the cooling unit to the center.

FIG. 2 is a longitudinal cross-section isometric view schematically illustrating another preferred embodiment of $CO_2$ waveguide-laser apparatus 20A in accordance with the present invention. Laser 20A is similar to laser 20 of FIG. 1 and FIGS. 1A-C, with an exception that fans 30 are arranged to drive air through the cooling-unit fins from the ends of the cooling unit to exit laterally at the center.

Figure 3:
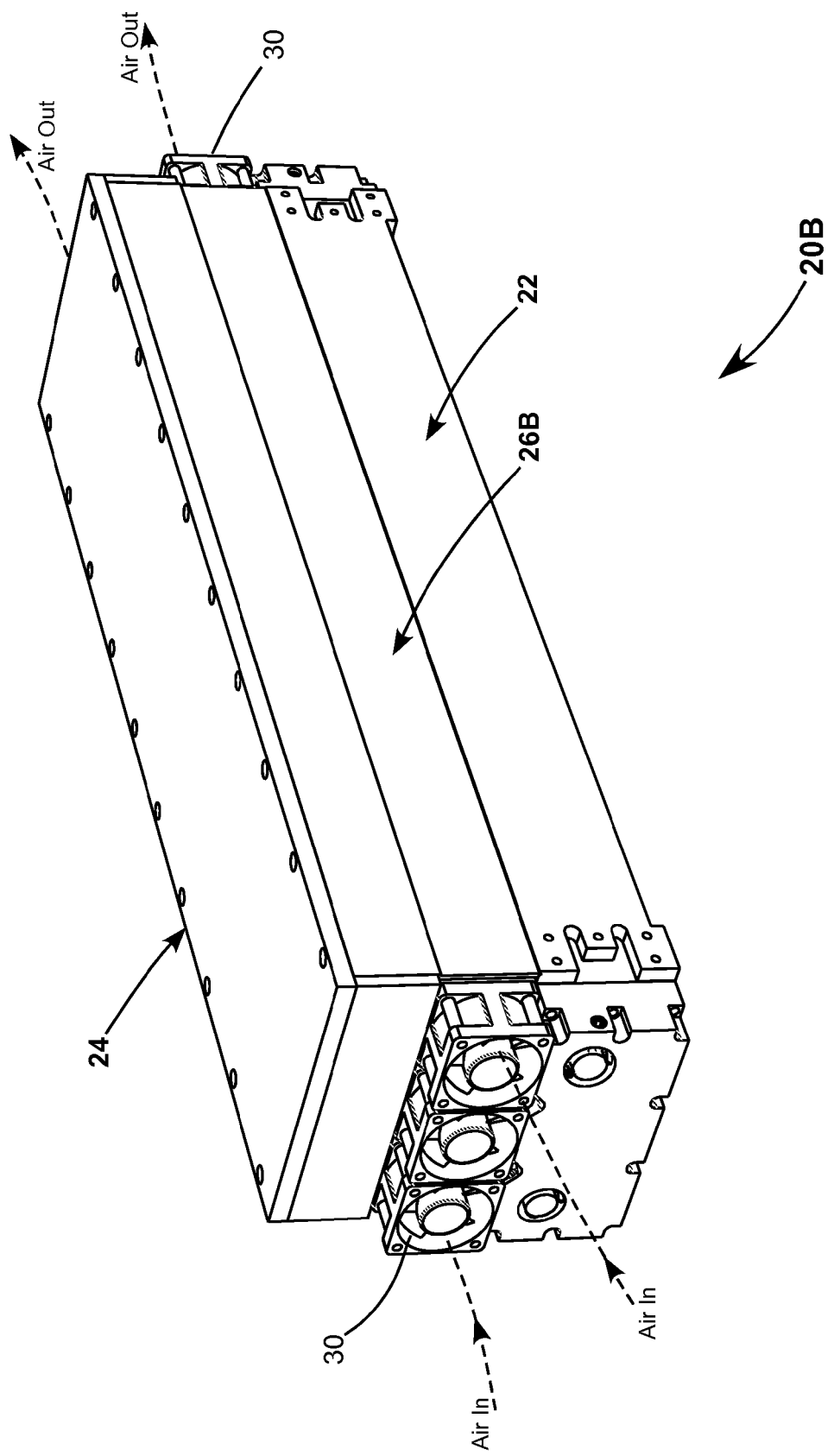
FIG. 3 is an isometric view schematically illustrating yet another preferred embodiment of $CO_2$ waveguide-laser apparatus in accordance with the present invention, similar to the embodiment of FIG. 2, but wherein the fans are arranged to drive air through the cooling-unit fins from one end of the cooling unit to the other end.

FIG. 3 is an isometric view schematically illustrating yet another preferred embodiment 20B of $CO_2$ waveguide-laser apparatus in accordance with the present invention. Laser 20B is similar to laser 20 of FIG. 2, but wherein fans 30 are arranged to drive air through the cooling-unit fins from one end of the cooling unit to the other end. This arrangement has an advantage that a machining operation is not required to form plenum spaces in cooling unit 26. This, however, is at the expense of a longer longitudinal temperature gradient.

In summary the present invention described above in terms of a preferred and other embodiments. The invention is not limited however to the embodiments described and depicted herein rather the invention is limited only by the claims appended hereto.

What is claimed is:

1. A laser apparatus, comprising:
an elongated, gas-filled resonator unit;
an elongated radio-frequency (RF) power supply unit for energizing gas in the resonator unit, the resonator and power supply units aligned, spaced apart and parallel to each other;
an elongated cooling unit including a plurality of elongated fins separating the power supply and resonator units, the fins being spaced and parallel to each other and extending in a length direction of the power supply and resonator units, opposite side edges of the fins being in direct thermal contact with the resonator unit and the power supply unit respectively; and
a plurality of fans arranged to drive air between the spaced-apart fins for cooling the power supply and resonator units.

2. The apparatus of claim 1, wherein the gas in the resonator unit is a mixture of gases including carbon dioxide.

3. The apparatus of claim 1, wherein the fans are arranged such that air is drawn into the cooling unit at about the center thereof, and expelled from opposite ends of the cooling unit.

4. The apparatus of claim 1, wherein the fans are arranged such that air is drawn into the cooling unit at opposite ends thereof, and expelled from the center of the cooling unit.

5. The apparatus of claim 1 wherein the fans are arranged such that air is drawn into the cooling unit at one end thereof and drawn out the cooling unit at an opposite end thereof.

6. The apparatus of claim 1 wherein the power-supply unit includes an RF power-supply assembled on a printed circuit board (PCB) and the resonator unit includes a ceramic plate having at least one waveguide-channel in a surface thereof for guiding a lasing mode of the laser, and wherein the PCB and the ceramic plate are in thermal communication with the cooling unit.

7. The apparatus of claim 6, wherein the waveguide-channeled surface of the ceramic plate faces the cooling unit.

8. A laser apparatus, comprising:
an elongated, gas-filled resonator unit;
an elongated radio-frequency (RF) power supply unit for energizing gas in the resonator unit, the resonator and power supply units aligned, spaced apart and parallel to each other;
an elongated cooling unit including a plurality of elongated fins separating the power supply and resonator units, the fins being spaced and parallel to each other and extending in a length direction of the power supply and resonator units;
a plurality of fans arranged to drive air between the spaced-apart fins for cooling the power supply and resonator units, wherein the fans are arranged such that air is drawn into the cooling unit at about the center thereof, and expelled from opposite ends of the cooling unit; and
the apparatus further including a plenum region aligned with the fans, said plenum region being positioned such that the plenum region takes the place of portions of the fins, said plenum region including baffles to direct air flow into the spaces between the fins.

9. A laser apparatus, comprising:
an elongated, gas filled resonator unit;
an elongated radio-frequency (RF) power supply unit for energizing gas in the resonator unit, the resonator and power supply units aligned, spaced apart and parallel to each other;
an elongated cooling unit including a plurality of elongated fins separating the power supply and resonator units, the fins being spaced and parallel to each other and extending in a length direction of the power supply and resonator units; and
a plurality of fans arranged to drive air between the spaced-apart fins for cooling the power supply and resonator units, the resonator and power-supply units each having a base in thermal communication with the cooling unit, with an RF power-supply mounted on the base of the power-supply unit and a resonator assembly mounted on the base of the resonator-unit, the base of the power-supply unit having a first thickness and the base of the resonator unit having a second thickness, and wherein the first and second thicknesses are selected such that the laser apparatus is thermo-mechanically neutral and wherein opposite side edges of the fins are in direct thermal contact with the base of the resonator unit and the base of the power supply respectively.

10. The apparatus of claim 9 wherein the first thickness is less than the second thickness.

11. The apparatus of claim 9, wherein the gas in the resonator unit is a mixture of gases including carbon dioxide.

12. The apparatus of claim 9, wherein the fans are arranged such that air is drawn into the cooling unit at about the center thereof, and expelled from opposite ends of the cooling unit.

13. The apparatus of claim 9, wherein the fans are arranged such that air is drawn into the cooling unit at opposite ends thereof, and expelled from the center of the cooling unit.

14. The apparatus of claim 9, wherein the fans are arranged such that air is drawn into the cooling unit at one end thereof and drawn out the cooling unit at an opposite end thereof.

15. The apparatus of claim 9 wherein the RF power-supply is assembled on a printed circuit board (PCB) and the resonator assembly includes a ceramic plate having at least one waveguide-channel in a surface thereof for guiding a lasing mode of the laser, and wherein the PCB and the ceramic plate are in thermal communication with respectively the base of the resonator-unit and the base of the power-supply unit.

16. The apparatus of claim 15, wherein the waveguide-channeled surface of the ceramic plate faces the cooling unit.

17. A laser apparatus comprising:
an elongated housing formed from a single piece of aluminum, said housing including a lower chamber holding electrodes and a laser gas, said lower chamber being terminated on opposite ends by laser mirrors, said housing further including an upper chamber holding a power supply for energizing the electrodes, said housing further including a plurality of spaced-apart machined fins extending between the opposite ends of the housing and being located between and directly connected to both the upper and lower chambers;
a pair of opposed plenum regions located intermediate the length of the housing and on the side edges of the housing extending into the region of the fins, said plenum regions including baffles for directing air flow to the spaces between the fins; and
a plurality of fans, aligned with the plenum regions, for driving air into the spaces between the fins and out the opposite ends of the housing.

* * * * *